318-135
4/12/88 OR 4,737,696

United States Patent [19]
Yokogawa et al.
[11] Patent Number: 4,737,696
[45] Date of Patent: Apr. 12, 1988

[54] ACTUATOR DRIVE CIRCUIT

[75] Inventors: Fumihiko Yokogawa; Akira Motoyama, both of Saitama, Japan

[73] Assignee: Pioneer Electronic Corporation, Tokyo, Japan

[21] Appl. No.: 58,126

[22] Filed: Jun. 4, 1987

[30] Foreign Application Priority Data

Jun. 12, 1986 [JP] Japan ........................... 61-89884[U]

[51] Int. Cl.⁴ ........................................ G05B 11/00

[52] U.S. Cl. ................................ 318/135; 318/687; 361/152

[58] Field of Search ...................... 318/135, 678, 687; 361/152, 154, 187

[56] References Cited

U.S. PATENT DOCUMENTS 4,423,361 12/1983 Stenudd et al. .................... 318/135
4,446,410 5/1984 Yagura et al. ...................... 318/135
4,527,108 7/1985 Enda .................................. 318/687
4,659,969 4/1987 Stupak, Jr. ......................... 318/128

*Primary Examiner*—Patrick R. Salce
*Assistant Examiner*—Judson H. Jones
*Attorney, Agent, or Firm*—Finnegan, Henderson, Farabow, Garrett and Dunner

[57] ABSTRACT

An actuator drive circuit for driving a load using a single power supply. The current drive is not dependent on load impedance characteristics. Drive means provides a voltage across the first terminal and the second terminal during at input signal positive phase, and reverse voltage across the first terminal and the second terminal during a negative phase. A current detection resistor is connected in series with the load, and the voltage across the resistor is input to a differential amplifier. The amplifier output provides feedback to the drive means.

28 Claims, 2 Drawing Sheets

ACTUATOR DRIVE CIRCUIT

FIELD OF THE INVENTION

The present invention relates to an actuator drive circuit for an optical information recorder or the like.

BACKGROUND OF THE INVENTION

One example of a conventional actuator drive circuit is shown in FIG. 3. The output terminal of an operational amplifier 52 is connected to the bases of transistors 56 and 57 through a resistor 55. The collectors of the transistors are respectively connected to a positive and a negative power supply. The emitters of the transistors are both connected to a second terminal of a load 58. The first terminal of load 58 is connected to a first terminal of a current detection resistor 59, and to the inverting input terminal of operational amplifier 52 through a feedback resistor 54. The second terminal of current detection resistor 59 is grounded. A signal input terminal 51 is connected to the inverting input terminal of operational amplifier 52 through an input resistor 53. The non-inverting input terminal of operational amplifier 52 is grounded. Since the open loop gain of operational amplifier 52 is generally very large, feedback is provided in such a manner that a signal applied to input terminal 51 is amplified by a gain determined by input resistor 53 and feedback resistor 54. The amplified signal appears at the connection point of the first terminals of load 58 and current detection resistor 59. Since the resistance Rc of current detection resistor 59 is related to the resistance $R_2$ of feedback resistor 54 so that Rc is much less than $R_2$, load 58 is subjected to a constant-current drive that is not dependent on the impedance characteristics of the load. However, a problem with this type of circuit is that both positive and negative power supplies are needed.

Another conventional actuator drive circuit (referred to as a bridge driver) which drives a load in a bidirectional manner using a single power supply is shown in FIG. 4. In this actuator drive circuit, a drive section 62 has a first output terminal for a positive-phase-sequence and a second output terminal for a negative-phase-sequence, and performs level shifting using a single power supply. A signal is applied to an input terminal 61, the first output terminal of the drive section is connected to the bases of transistors 63 and 66, and the second output terminal is connected to the bases of transistors 64 and 65. The emitter of transistor 63 and the collector of transistor 65 are connected to a first terminal of the load 67. The emitter of transistor 64 and the collector of transistor 66 are connected to the second terminal of load 67. The collectors of transistors 63 and 64 are connected to the single power supply, while the emitters of transistors 65 and 66 are grounded. The signal applied to input terminal 61 is subjected to level shifting by drive section 62 so that the drive circuit can operate using the single power supply. If the input signal is sinusoidal, transistors 63 and 66 are turned on and transistors 64 and 65 are turned off during the positive half cycle of the signal, and transistors 63 and 66 are turned off and transistors 64 and 65 are turned on during the negative half cycle of the signal, to drive load 67 in a bidirectional manner. Although load 67 is driven using the single power supply, this actuator drive circuit has a drawback in that the current flowing through load 67 is dependent on the impedance characteristics of the load. This is because a constant-voltage drive is provided to the load. When an inductive load, such as a linear motor actuator, is driven by the actuator drive circuit, the problem is especially serious because the inductance of the load generates a pole that adversely affects the stability of a servo system.

SUMMARY OF THE INVENTION

The present invention was made in order to overcome the problems and disadvantages of the conventional actuator drive circuits described above.

Accordingly, it is an object of the invention to provide an actuator drive circuit capable of performing constant-current drive of a load using a single power supply.

It is an additional object of the invention for the actuator drive circuit to drive the load in a bidirectional manner.

It is a further object of the invention for the current flowing through the load to be proportional to the amplitude of a signal applied to a signal input terminal.

It is still another object of the invention to provide a constant-current drive for the load in which the current flowing through the load is not dependent on the impedance characteristics of the load.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, there is provided an actuator drive circuit for driving a load in a bidirectional manner using a single power supply in response to an input signal. The actuator drive circuit includes a signal input terminal for receiving the input signal; current detection means having a first terminal connected to a first terminal of the load; and drive means for driving the load in a bidirectional manner with a current drive. The drive means is connected to the signal input terminal and has a first output terminal connected to a second terminal of the load and a second output terminal connected to a second terminal of the current detection means. The first and second output terminals have low impedance and are adapted to be coupled to the single power supply, and the first and second output terminals provide a voltage for driving the load in one direction during a positive phase of the input signal and for driving the load in the other direction during a negative phase of the input signal. The drive circuit further includes amplification means for amplifying the voltage across the current detection means to provide an amplified voltage at an activator output terminal. The amplification means has a first input terminal connected to the first terminal of the current detection means and a second input terminal connected to the second terminal of the current detection means, and has an input impedance substantially greater than the impedance of the current detection means such that the current drive on the load provided by the drive means is a constant-current drive that is not dependent on the impedance characteristics of the load. The drive circuit also has feedback means connected to the actuator output terminal and to the drive means, for feeding back the amplified voltage to the drive means such that the voltage provided by the drive means for driving the load is proportional to the input signal voltage.

The accompanying drawings, which are incorporated in and constitute a part of this specification, illustrate preferred embodiments of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
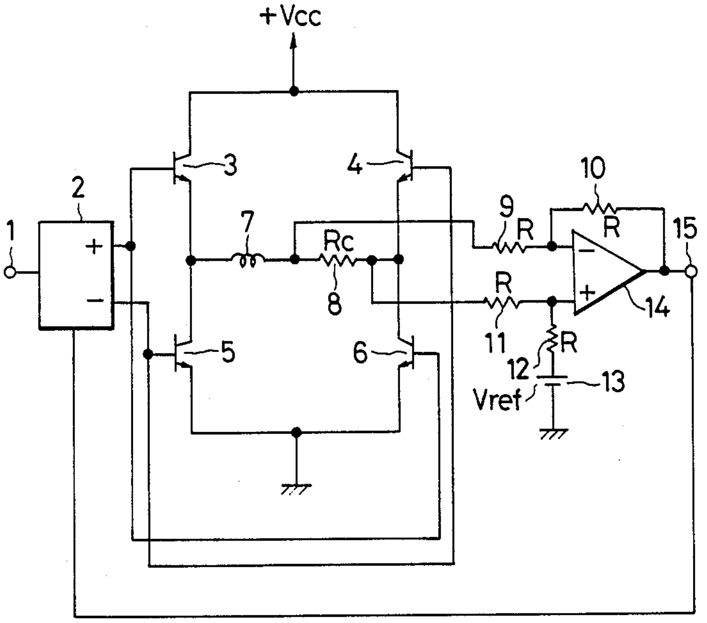
FIG. 1 shows an actuator drive circuit which is one embodiment of the invention.

FIG. 1 shows an actuator drive circuit constituting a preferred embodiment of the present invention. In accordance with the invention, there is provided drive means for driving the load in a bidirectional manner with a current drive, the drive means connected to the signal input terminal and having a first output terminal connected to a second terminal of the load and a second output terminal connected to a second terminal of the current detection means, the first and second output terminals having low impedance and adapted to be coupled to the single power supply, the first and second output terminals providing a voltage for driving the load in one direction during a positive phase of the input signal and for driving the load in the other direction during a negative phase of the input signal. As shown in FIG. 1, the drive means may include a drive section 2 and transistors 3, 4, 5, and 6. The first output terminal of drive section 2 is connected to the bases of transistors 3 and 6, and the second output terminal of drive section 2 is connected to the bases of transistors 4 and 5. Drive section 2 provides level shifting so that the drive means can operate using a single power supply. The emitter of transistor 3 and the collector of transistor 6 are connected to a second terminal of a load 7. The emitter of transistor 4 and the collector of transistor 6 are connected to a second terminal of a current detection resistor 8. The collectors of transistors 3 and 4 are connected to a single power supply, while the emitters of transistors 5 and 6 are grounded.

The invention includes current detection means having a first terminal connected to a first terminal of the load. In the preferred embodiment, the current detection means is resistor 8. Resistor 8 functions to detect the current flowing through load 7, and its first terminal is connected to the first terminal of load 7.

In accordance with the invention, amplification means is provided for amplifying the voltage across the current detection means to provide an amplified voltage at an activator output terminal, the amplifier means having a first input terminal connected to the first terminal of the current detection means and a second input terminal connected to the second terminal of the current detection means, and having an input impedance substantially greater than the impedance of the current detection means such that the current drive on the load provided by the drive means is a constant-current drive that is not dependent on the impedance characteristics of the load. As embodied herein, the amplification means may be provided by a differential amplifier, which includes resistors 9, 10, 11 and 12, a constant voltage source 13, and an operational amplifier 14. The first and second input terminals of the amplification means are respectively connected to the first and second terminals of current detection resistor 8.

The invention also includes feedback means connected to the actuator output terminal and to the drive means, for feeding back the amplified voltage to the drive means such that the voltage provided by the drive means for driving the load is proportional to the input signal voltage. Preferably, the feedback means is provided by lines, resistors, or operational amplifiers. The amplified voltage of operational amplifier 14 is provided at an actuator output terminal 15 and is fed back to drive section 2 by a line.

The resistances of current detection resistor 8 and resistors 9, 10, 11 and 12 are set with the resistance Rc of current detection resistor 8 and the resistance R of resistor 10 related to each other so that R c is much less than R. As a result, the current flowing through load 7 and that flowing through current detection resistor 8 are nearly equal to each other, because the input impedance of the amplifier means is substnatially greater than the impedance of resitor 8.

The voltage across current detection resistor 8 is applied to the input terminals of operational amplifier 14, which is a component of the differnetial amplifier, and is proportional to the current flowing through resistor 8. Actuator output terminal 15 is connected to drive section 2 to feed back the amplified voltage to the drive means, so that the voltage across (and also the current drive through) current detection resistor 8 provided at the first and second output terminals of the drive means will be proportional to the amplitude of the signal applied to signal input terminal 1.

Although resistor 8 is used as the means to detect the current flowing through load 7 in the preferred embodiment, a ferrite core may be used instead of a resistor to detect the current.

Figure 2:
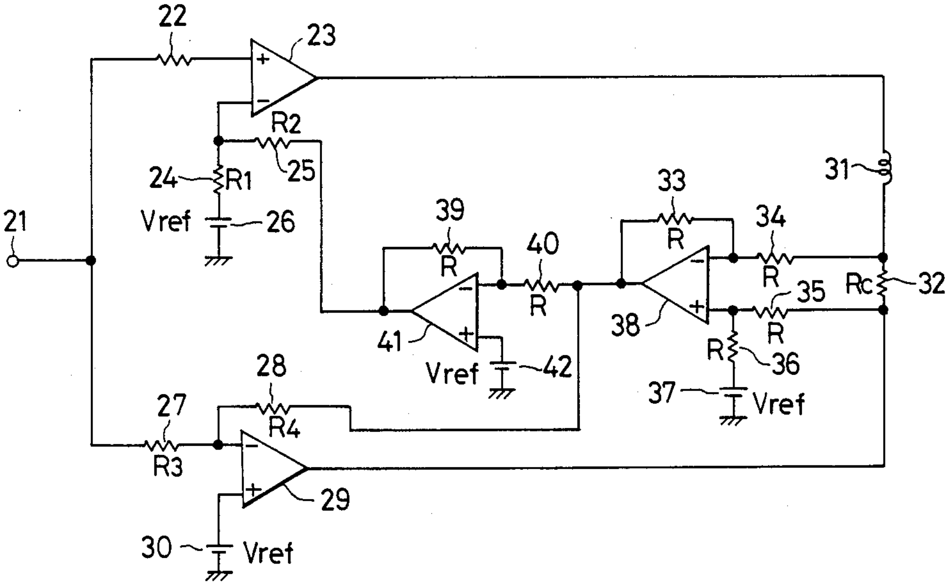
FIG. 2 shows an actuator drive circuit which is another embodiment of the invention.
Figure 3:
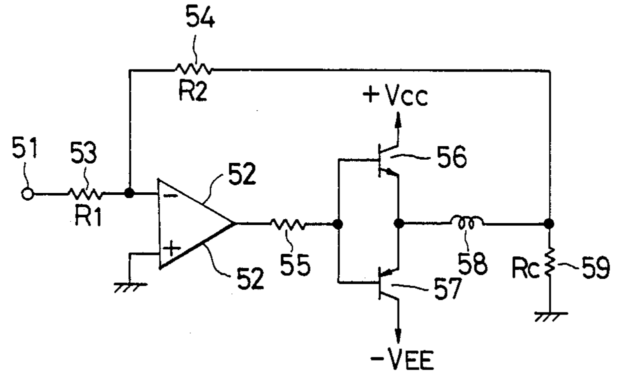
FIG. 3 PRIOR ART
FIG. 3 shows an example of a conventional actuator drive circuit.
Figure 4:
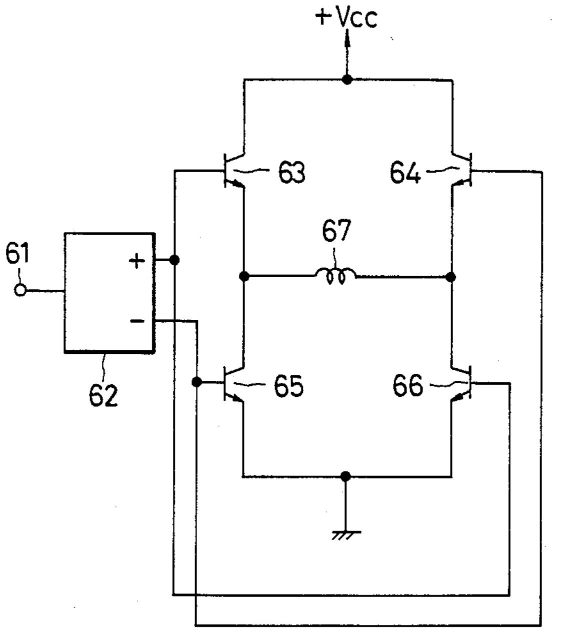
FIG. 4 PRIOR ART
FIG. 4 shows another example of a conventional actuator drive circuit.

FIG. 2 shows an actuator drive circuit which constitutes another preferred embodiment of the invention. As shown in FIG. 2, the first terminals of a load 31 and a current detection resistor 32 are connected in series. Preferably, the drive means includes a non-inverting operational amplifier having a non-inverting input terminal connected to the signal input terminal, an inverting input terminal adapted to be coupled to the single power supply, and an output terminal having a low impedance and connected to the first output terminal of the drive means. The second terminal of load 31 is connected to the output terminal of a non-inverting amplifier comprising resistors 22, 24, and 25, a constant voltage source 26, and an amplifier 23.

The drive means may also include an inverting operational amplifier having an inverting input terminal connected to the signal input terminal, a non-inverting input terminal adapted to be coupled to the single power supply, and an output terminal having a low impedance and connected to the second output terminal of the drive means. The second terminal of resistor 32 is connected to the output terminal of a first inverting amplifier comprising resistors 27 and 28, a constant voltage source 30, and an amplifier 29.

As shown in FIG. 2, the amplification means may be a differential amplifier, comprising resistors 33, 34, 35 and 36, a constant voltage source 37, and an operational amplifier 38. The input terminals of the differential amplifier are connected to both terminals of current detection resistor 32.

As herein embodied, the feedback means includes a feedback resistor connected to the actuator output terminal and to the inverting input terminal of the inverting operational amplifier for feeding back a voltage having a phase equal to the reverse polarity of the input signal. The output terminal of the differential amplifier is connected through feedback resistor 28 to the inverting input terminal of amplifier 29, which is a component of the first inverting amplifier.

Preferably, the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polarity of the input signal. The output terminal of the differential amplifier is also connected to a second inverting amplifier, which comprises resistors 39 and 40, a constant voltage source 42, and an operational amplifier 41. The output terminal of this inverting amplifier is connected to the inverting input terminal of amplifier 23, which is a component of the non-inverting amplifier.

The output of operational amplifier 38, which is a component of the differential amplifier, is fed back to the drive means in such a manner that after the voltage across current detection resistor 32 is detected, an amplified output is generated by multiplying an input signal at signal input terminal 21 by the gain $-R_4/R_3$. $R_3$ and $R_4$ denote the resistances of input resistor 27 and feedback resistor 28 for the first inverting amplifier.

The output of operational amplifier 41, which is a component of the second inverting amplifier, is a voltage whose phase is equal to that of the voltage across current detection resistor 32 during positive and negative phases of the input signal. The output of operational amplifier 41 is fed back to the drive means in such a manner that the feedback is generated by multiplying an input signal at signal input terminal 21 by the gain $1+R_2/R_1$. $R_1$ and $R_2$ denote the resistances of input resistor 24 and feedback resistor 25 for the non-inverting amplifier.

The voltage across current detection resistor 32 corresponds to the current drive flowing therethrough. The resistance Rc of current detection resistor 32 and resistances R of the differential amplifier are set so that Rc is much less than R. As a result, current flowing through current detection resistor 32 is nearly equal to that flowing through load 31. Therefore, the load is subjected to a constant-current drive, the current flowing through the load is proportional to the input signal applied to input terminal 31, and the current drive is not dependent on the impedance characteristics of the load.

What is claimed is:

1. An actuator drive circuit for driving a load in a bidirectional manner using a single power supply in response to an input signal, comprising:

a signal input terminal for receiving the input signal;

current detection means having a first terminal connected to a first terminal of the load;

drive means for driving the load in a bidirectional manner with a current drive, the drive means being connected to the signal input terminal and having a first output terminal connected to a second terminal of the load and a second output terminal connected to a second terminal of the current detection means, the first and second output terminals having low impedance and adapted to be coupled to the single power supply, the first and second output terminals providing a voltage for driving the load in one direction during a positive phase of the input signal and for driving the load in the other direction during a negative phase of the input signal;

amplification means for amplifying the voltage across the current detection means to provide an amplified voltage at an activator output terminal, the amplifier means having a first input terminal connected to the first terminal of the current detection means and a second input terminal connected to the second terminal of the current detection means, and having an input impedance substantially greater than the impedance of the current detection means such that the current drive on the load provided by the drive means is a constant-current drive that is not dependent on the impedance characteristics of the load; and feedback means connected to the actuator output terminal and to the drive means, for feeding back the amplified voltage to the drive means such that the voltage provided by the drive means for driving the load is proportional to the input signal voltage.

2. An actuator drive circuit in accordance with claim 1, in which the current detection means is a resistor.

3. An actuator drive circuit in accordance with claim 2, in which the amplification means is a differential amplifier.

4. An actuator drive circuit in accordance with claim 3, in which:

the drive means includes an inverting operational amplifier having an inverting input terminal connected to the signal input terminal, a non-inverting input terminal adapted to be coupled to the single power supply, and an output terminal having a low impedance and connected to the second output terminal.

5. An actuator drive circuit in accordance with claim 4, in which:

the feedback means includes a feedback resistor connected to the actuator output terminal and to the inverting input terminal of the inverting operational amplifier for feeding back a voltage having a phase equal to the reverse polality of the input signal.

6. An actuator drive circuit in accordance with claim 4, in which:

the drive means includes a non-inverting operational amplifier having a non-inverting input terminal connected to the signal input terminal, an inverting input terminal adapted to be coupled to the single power supply, and an output terminal having a low impedance and connected to the first output terminal.

7. An actuator drive circuit in accordance with claim 6, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

8. An actuator drive circuit in accordance with claim 7, in which:

the feedback means includes a feedback resistor connected to the actuator output terminal and to the inverting input terminal of the inverting operational amplifier for feeding back a voltage having a phase equal to the reverse polality of the input signal.

9. An actuator drive circuit in accordance with claim 6, in which:

the feedback means includes a feedback resistor connected to the actuator output terminal and to the inverting input terminal of the inverting operational amplifier for feeding back a voltage having a phase equal to the reverse polality of the input signal.

10. An actuator drive circuit in accordance with claim 3, in which:

the drive means includes a non-inverting operational amplifier having a non-inverting input terminal connected to the signal input terminal, an inverting input terminal adapted to be coupled to the single power supply, and an output terminal having a low impedance and connected to the first output terminal.

11. An actuator drive circuit in accordance with claim 10, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

12. An actuator drive circuit in accordance with claim 2, in which:

the drive means includes an inverting operational amplifier having an inverting input terminal connected to the signal input terminal, a non-inverting input terminal adapted to be coupled to the single power supply, and an output terminal having a low impedance and connected to the second output terminal.

13. An actuator drive circuit in accordance with claim 12, in which:

the feedback means includes a feedback resistor connected to the actuator output terminal and to the inverting input terminal of the inverting operational amplifier for feeding back a voltage having a phase equal to the reverse polality of the input signal.

14. An actuator drive circuit in accordance with claim 12, in which:

the drive means includes a non-inverting operational amplifier having a non-inverting input terminal connected to the signal input terminal, an inverting input terminal adapted to be coupled to the single power supply, and an output terminal having a low impedance and connected to the first output terminal.

15. An actuator drive circuit in accordance with claim 14, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

16. An actuator drive circuit in accordance with claim 15, in which:

the feedback means includes a feedback resistor connected to the actuator output terminal and to the inverting input terminal of the inverting operational amplifier for feeding back a voltage having a phase equal to the reverse polality of the input signal.

17. An actuator drive circuit in accordance with claim 14, in which:

the feedback means includes a feedback resistor connected to the actuator output terminal and to the inverting input terminal of the inverting operational amplifier for feeding back a voltage having a phase equal to the reverse polality of the input signal.

18. An actuator drive circuit in accordance with claim 2, in which:

the drive means includes a non-inverting operational amplifier having a non-inverting input terminal connected to the signal input terminal, an inverting input terminal adapted to be coupled to the single power supply, and an output terminal having a low impedance and connected to the first output terminal.

19. An actuator drive circuit in accordance with claim 18, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

20. An actuator drive circuit in accordance with claim 1, in which the current detection means is a ferrite core.

21. An actuator drive circuit in accordance with claim 1, in which:

the drive means includes an inverting operational amplifier having an inverting input terminal connected to the signal input terminal, a non-inverting input terminal adapted to be coupled to the single power supply, and an output terminal having a low impedance and connected to the second output terminal.

22. An actuator drive circuit in accordance with claim 21, in which:

the feedback means includes a feedback resistor connected to the actuator output terminal and to the inverting input terminal of the inverting operational amplifier for feeding back a voltage having a phase equal to the reverse polality of the input signal.

23. An actuator drive circuit in accordance with claim 21, in which: the drive means includes a non-inverting operational amplifier having a non-inverting input terminal connected to the signal input terminal, an inverting input terminal adapted to be coupled to the single power supply, and an output terminal having a low impedance and connected to the first output terminal.

24. An actuator drive circuit in accordance with claim 23, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

25. An actuator drive circuit in accordance with claim 24, in which:

the feedback means includes a feedback resistor connected to the actuator output terminal and to the inverting input terminal of the inverting operational amplifier for feeding back a voltage having a phase equal to the reverse polality of the input signal.

26. An actuator drive circuit in accordance with claim 23, in which:

the feedback means includes a feedback resistor connected to the actuator output terminal and to the inverting input terminal of the inverting operational amplifier for feeding back a voltage having a phase equal to the reverse polality of the input signal.

27. An actuator drive circuit in accordance with claim 1, in which:

the drive means includes a non-inverting operational amplifier having a non-inverting input terminal connected to the signal input terminal, an inverting input terminal adapted to be coupled to the single power supply, and an output terminal having a low impedance and connected to the first output terminal.

28. An actuator drive circuit in accordance with claim 27, in which:

the feedback means includes an inverting operational amplifier having an inverting input terminal connected to the actuator output terminal, a non-inverting input terminal adapted to be coupled to the single power supply, and an output terminal connected to the inverting input terminal of the non-inverting operational amplifier for feeding back a voltage having a phase equal to the same polality of the input signal.

* * * * *